United States Patent Office 3,167,586
Patented Jan. 26, 1965

3,167,586
PREPARATION OF CIS-1,2-DIAMINOCYCLO-HEXANE
Andrew I. Smith, Raleigh, N.C., assignor, by mesne assignments, to Monsanto Company, a corporation of Delaware
No Drawing. Filed Nov. 6, 1961, Ser. No. 150,188
6 Claims. (Cl. 260—563)

This invention relates to a new process for the production of 1,2-diaminocyclohexane, and more particularly to a method for the production of cis 1,2-diaminocyclohexane in a pure form.

Various methods have been proposed for the production of 1,2-diaminocyclohexane which is a valuable intermediate product for dyestuffs, textile assistants, fungicides, insecticides and pharmaceutical products. Among the methods previously suggested have been the reduction of ortho-nitroaniline, the reduction of 1,2-diaminobenzene, the reduction of 1,2-dinitrocyclohexane and conversion of α-halogen cycloalkanones by reaction with urea in the presence of a hydrogen halide-binding agent followed by hydrogenation, hydrolysis and purification. All of these prior art methods suffer from one or more disadvantages which include poor yields, the need for expensive or not readily available starting materials, expensive equipment and the requirement for critical and complicated process conditions.

It is an object of this invention to produce 1,2-diaminocyclohexane in good yield from readily available starting materials.

It is a further object of this invention to produce 1,2-diaminocyclohexane in substantially pure cis isomeric form.

It is a further object of this invention to produce cis 1,2-diaminocyclohexane by a method which is economical and efficient.

Other objects and advantages of the present invention will become apparent from the detailed description given hereinafter. It should be understood, however, that the detailed description and specific examples, while indicating preferred embodiments of this invention, are given by way of illustration, since various changes and modifications within the spirit and scope of the invention will become apparent to those skilled in the art from this detailed description.

The above objects and advantages are accomplished by the present invention wherein substantially pure cis 1,2-diaminocyclohexane is prepared by reacting o-phenylenediamine with urea in the presence of a suitable solvent, separating benzimidazole-2-one from the cooled product, and hydrogenating this benzimidazole-2-one to form 4,5-cycloheximidazole-2-one which is then hydrolyzed in a concentrated mineral acid to form the acid salt of the desired cis 1,2-diaminocyclohexane. The final product may be recovered by neutralization, extraction and fractionation procedures.

In the first step of the process o-phenylenediamine is added to a solution of urea in a suitable solvent which may be an aliphatic alcohol, such as butanol, pentanol, hexanol, octanol, nonanol, etc., or an ether solvent, such as the monoethylether of ethylene glycol, the monomethyl ether of propylene glycol, diethylether of diethylene glycol, etc. Water can be used as the solvent but yields are much lower, at least for equivalent period of reflux. The solution is then heated at a temperature of at least 100° C., and preferably under reflux, for a period of 2 to 4 hours until the reaction is complete as indicated by cessation of evolution of ammonia. Upon cooling, solid benzimidazole-2-one is separated from the solution by filtration, and then washed with suitable agents such as acetone, ethanol, propanol, or butanol before drying.

In the next stage of operation, the dried benzimidazole-2-one is dissolved in an alcohol solvent such as absolute ethanol, propanol, butanol, etc., and subjected to hydrogen gas in the presence of a hydrogenation catalyst. The hydrogen is advantageously introduced under pressure of 1500–3500 p.s.i.g. and at temperatures of 110–180° C. though lower and higher pressures can be employed.

Preferred catalysts for the hydrogenation of the benzimidazole-2-one are ruthenium dioxide, noble metal catalysts, such as platinum dioxide, nickel catalysts, such as Raney nickel or nickel-on-kieselguhr, and cobalt catalysts, such as Raney cobalt.

The hydrogenation product consisting of 4,5-cycloheximidazole-2-one, also termed N,N-cyclohexylene urea, is then hydrolyzed by means of a mineral acid such as 60% sulfuric acid or 70% phosphoric acid. The acid salt of the 1,2-diaminocyclohexane formed by acid hydrolysis is treated with excess sodium hydroxide solution to release free cis 1,2-diaminocyclohexane. Other alkaline solutions such as potassium hydroxide or ammonium hydroxide can be used in place of sodium hydroxide. The product may then be isolated and further purified by ether extraction or extraction with ether-alcohol mixtures, and the ether and alcohol evaporated. The product may be even further purified by fractional distillation.

The following examples are presented to more particularly illustrate the process of this invention. All parts and percentages are by weight unless otherwise stated.

*Example 1*

To a solution composed of 50 grams of urea and 250 ml. of ethylene glycol monoethylether there were added with stirring 44.5 grams of o-phenylenediamine. The solution was refluxed for 2 hours and then cooled, whereupon a white solid product separated from the solution. This solid was recovered by suction filtration and slurried with successive batches of approximately 100 ml. of acetone and approximately 100 ml. of absolute alcohol and then dried on the filter. The product was next recrystallized from a 15–30% aqueous ethanol solution and again dried. The weight of the dried product, benzimidazole-2-one, was 18.0 grams and the melting point was 300+° C. The reported melting point of pure benzimidazole-2-one is 311° C.

The 18 grams of benzimidazole-2-one was placed in a hydrogenation bomb with 100 ml. of absolute ethanol as a solvent and about 1 gram of ruthenium oxide catalyst. Hydrogenation was carried out at a pressure of 2500–3200 p.s.i.g. and 150° C. Reduction started at a temperature of 110° C. as evidenced by a 200–300 lb. pressure drop, and hydrogenation was continued until the amount of hydrogen taken up corresponded to the theoretical amount required. The catalyst was then filtered off, the ethanol solvent evaporated and the residue distilled under vacuum. The product was 4,5-cycloheximidazole-2-one or N,N'-cyclohexylene urea.

The hydrolysis of the cyclohexylene urea was conducted by heating the product with 60% by weight sulfuric acid at a maximum temperature of 110° C. for several hours. The resulting clear solution was cooled in an ice water bath and then made alkaline with an excess of 50% by weight aqueous sodium hydroxide solution. The liberated cis 1,2-diaminocyclohexane was extracted with a 9:1 by volume ether:n-butanol solution and purified by fractionation with a fractionating column after evaporation of the ether and removal of the n-butanol under reduced pressure. Gas chromatography analysis showed that the product was pure cis 1,2-diaminocyclohexane, when the chromatogram was compared to that of a known cis 1,2-diaminocyclohexane sample which was separated by the same column used for the analysis.

*Example II*

Fifty grams of urea (0.834 mol) was dissolved in 250 ml. of ethylene glycol monoethylether together with 44.5 grams (0.411 mol) of o-phenylenediamine and the solution was then refluxed for 4 hours. The solution was cooled, and the white solid product collected by suction filtration as in Example I. The crude solid product was washed with 150 ml. of water while on the filter, and then washed with 100 ml. of acetone in a beaker. After filtration, the product was then slurried well with 100 ml. of absolute ethanol and dried on the filter in air followed by further drying in a vacuum oven. The yield of benzimidazole-2-one was 48.0 grams or 84.5% of theoretical.

The 48.0 grams of benzimidazole-2-one was placed in a hydrogenation bomb with 250 ml. of ethanol and 2 grams of ruthenium oxide catalyst. Hydrogenation was then conducted at 150° C. and 2800 p.s.i.g. pressure for a period of 4 hours. After hydrogenation, the catalyst was removed by filtration and the clear, water-white alcohol solution was evaporated to dryness. The dried crude product weighing 44.5 grams was then recrystallized from 150 ml. of benzene. The final product, 4,5-cycleheximidazole-2-one, or N,N'-cyclohexylene urea, melted at 150–153° C., as determined on a Fisher-Johns hot stage melting point apparatus, and its weight was 43.3 grams, a yield of 75.3% of theoretical from the starting o-phenylenediamine.

Fifty-six grams of 4,5-cycleheximidazole-2-one prepared above were hydrolyzed at 107° C. with 120 grams of 60% sulfuric acid, the heating being conducted for 1½ hours. The product was cooled in an ice water bath and then made basic by adding an excess of 50% by weight sodium hydroxide solution. The mixture was extracted three times with 75 ml. portions of a 4:1 ether:n-butyl alcohol solution. The ether was then removed by evaporation and the residue fractionally distilled under reduced pressure using a 100 plate Podbielniak column. After discharging the first several ml. of cis 1,2-diaminocyclohexane which came overhead, three fractions which totaled 31.5 ml. or 29.6 grams were collected. The yield was 65% of the theoretical. The cis 1,2-diaminocyclohexane was identified as pure by gas chromatography in the same manner as in Example I.

*Example III*

There was dissolved in 50 ml. of n-butanol 11.2 grams of urea (0.187 mole) and 10.0 grams of o-phenylenediamine (0.093 mole). The resulting solution was then heated to reflux temperature and under reflux for a period of three hours. The solution was cooled, and the white solid product collected by suction filtration. After washing with both water and acetone, the product was then slurried in ethanol and dried in the same manner as Example II. There was recovered 12.3 grams of benzimidazole-2-one or 95% of theoretical. The resulting benzimidazole-2-one is hydrogenated over a ruthenium oxide catalyst and the resulting N,N'-cyclohexylene urea hydrolyzed with 60% sulfuric acid in the same manner as in Example II above to produce pure cis 1,2-diaminocyclohexane.

*Example IV*

To illustrate the results realized when the solvent is water there was dissolved in 50 ml. of distilled water 11.2 grams of urea (0.187 mole) and 10.0 grams of o-phenylenediamine (0.093 mole). The solution was heated to reflux and maintained there for 3 hours. The solution was cooled and the white precipitate filtered as above. After washing in water and acetone, slurrying in ethanol and drying as above there was recovered 4.4 grams of benzimidazole-2-one or 35% of theoretical. The benzimidazole-2-one product is hydrogenated employing a ruthenium oxide hydrogenation catalyst and the N,N'-cyclohexylene urea product hydrolyzed by 60% sulfuric acid and neutralized with sodium hydroxide solution as in Example II above to produce pure cis 1,2-diaminocyclohexane.

The above described invention provides a simple and commercially feasible method for the preparation of cis 1,2-diaminocyclohexane in pure form by conversion of readily available starting materials at a high yield.

It is apparent that widely varying embodiments of this invention may be made without departing from the spirit and scope thereof and therefore it is not intended to be limited except as indicated in the appended claims.

What is claimed is:

1. A process for the manufacture of pure cis 1,2-diaminocyclohexane comprising refluxing a solution of urea and o-phenylene diamine in a mutual solvent selected from the group consisting of alkanols containing from 4 to 9 carbon atoms, mono- and dialkyl ethers of alkylene glycols and water, separating and hydrogenating the resulting product at a pressure of 1500 to 3500 p.s.i.g. at a temperature of 110° to 180° C. in the presence of a ruthenium oxide catalyst, separating and hydrolyzing the resulting N,N'-cyclohexylene urea with a strong mineral acid and neutralizing the resulting solution to recover cis 1,2-diaminocyclohexane.

2. A process for the manufacture of pure cis 1,2-diaminocyclohexane comprising refluxing a solution of urea and o-phenylenediamine in a mutual solvent selected from the group consisting of alkanols containing from 4 to 9 carbon atoms, mono- and dialkyl ethers of alkylene glycols and water, cooling the solution and separating solid benzimidazole-2-one therefrom, dissolving said benzimidazole-2-one in ethanol and hydrogenating the same at a pressure of 1500–3500 p.s.i.g. at a temperature of 110–180° C. in the presence of a ruthenium oxide catalyst, separating N,N'-cyclohexylene urea and hydrolyzing the same with 60% sulfuric acid at a temperature of not greater than 110° C., cooling the hydrolyzed solution and rendering the same alkaline to produce cis 1,2-diaminocyclohexane.

3. The process of claim 2 wherein the mutual solvent is ethylene glycol monoethylether.

4. The process of claim 2 wherein the mutual solvent is n-butanol.

5. The process of claim 2 wherein the mutual solvent is n-pentanol.

6. The process of claim 2 wherein the mutual solvent is water.

References Cited in the file of this patent

UNITED STATES PATENTS

| | | |
|---|---|---|
| 2,514,380 | Duschinsky | July 11, 1950 |
| 2,606,926 | Kirbey | Aug. 12, 1952 |
| 2,933,503 | Klopping et al. | Apr. 19, 1960 |

FOREIGN PATENTS

| | | |
|---|---|---|
| 810,844 | Great Britain | Mar. 25, 1959 |
| 811,692 | Great Britain | Apr. 8, 1959 |

OTHER REFERENCES

Efros et al.: C.A., vol. 48, p. 13686 (1954).